United States Patent Office 3,804,909
Patented Apr. 16, 1974

---

3,804,909
PROCESS FOR THE MANUFACTURE OF PENTAFLUOROETHYL IODIDE
Hans Millauer, Frankfurt am Main, Germany, assignor to Farbwerke Hoechst Aktiengesellschaft vormals Meister Lucius & Brüning, Frankfurt am Main, Germany
No Drawing. Filed Dec. 10, 1971, Ser. No. 206,941
Claims priority, application Germany, Nov. 2, 1971, P 21 54 512.0
Int. Cl. C07c 17/20, 19/08
U.S. Cl. 260—653.7                                   4 Claims

ABSTRACT OF THE DISCLOSURE

Pentafluoroethyl iodide is prepared by reacting 1,1,2,2-tetrafluoro-diiodoethane or a mixture of tetrafluoroethylene and iodine with hydrogen fluoride in the presence of chlorine.

---

In my copending application Ser. No. 206,919 filed concurrently herewith I have described a process for the manufacture of fluoroalkyl iodides of the general formula R—CFI—$CF_3$ in which R represents fluorine or trifluoromethyl, which comprises reacting a mixture of a fluoroalkylene of the general formula R—CF=$CF_2$, wherein R represents fluorine or trifluoromethyl, and iodine with hydrogen fluoride in the presence of an oxidizing compound selected from the group consisting of oxyacids, their alkali metal salts, alkaline earth metal salts, halides, anhydrides, oxyacids of an at least pentavalent halogen (Cl, Br, I), pentavalent nitrogen, and their salts.

The present invention relates to a process for the manufacture of pentafluoroethyl iodide by reacting 1,1,2,2-tetrafluoro-diiodoethane or a mixture of tetrafluoroethylene and iodine with hydrogen fluoride in the presence of chlorine.

I have further found that pentafluoroethyl iodide can also be prepared by reacting 1,1,2,2-tetrafluoro-diiodoethane or a mixture of tetrafluoroethylene and iodine with hydrogen fluoride in the presence of chlorine at a temperature in the range of from 50 to 170° C., preferably 80 to 150° C. Under the reaction conditions the mixture of tetrafluoroethylene and iodine forms 1,1,2,2-tetrafluoro-diiodoethane or it is in equilibrium with the latter. In this case tetrafluoroethylene and iodine are used in a molar ratio of 1:1 to 1:2.

When the reaction is carried out in the presence of chlorine it proved advantageous to use an excess of iodine. It is therefore suitable to operate with additional 0.5 to 1 mol of iodine per mol of fluorinated compound even if the reaction is carried out with 1,1,2,2-tetrafluoro-diiodoethane.

1,1,2,2-tetrafluoro-diiodoethane or tetrafluoroethylene and chlorine are used in a molar ratio of from 1:0.5 to 1:0.7.

To carry out the reaction it is suitable to introduce hydrogen fluoride, 1,1,2,2-tetrafluoro-diiodoethane and optionally additional iodine into an autoclave made of stainless steel, for example a chromium/nickel/molybdenum steel, and to add the required amount of chlorine all at once prior to heating or to add it in portions during the course of reaction. When the reaction is carried out using a mixture of tetrafluoroethylene and iodine instead of 1,1,2,2-tetrafluoro-diiodoethane, it may be advantageous to add $CF_2$=$CF_2$ as last reaction component while stirring and heating.

The following example illustrates the invention.

EXAMPLE 1

A 1 liter autoclave made of $V_4A$ steel provided with magnetic stirrer and electric heating was charged with 177 grams (0.50 mole) of 1,1,2,2-tetrafluoro-diiodoethane ($CF_2I$—$CF_2I$), 127 grams (0.50 mole) of iodine, 200 grams (10 moles) of hydrogen fluoride, and 25 grams (0.35 mole) of chlorine and the reaction mixture was stirred for 3 hours at 150° C. The reaction mixture was allowed to cool to 50° C. and the gaseous reaction products were slowly withdrawn from the autoclave without stirring. They were successively passed through a wash bottle containing 800 milliliters of water, a wash bottle containing aqueous potassium hydroxide solution of 20% strength, a drying tower filled with granular calcium chloride and finally into a trap cooled at −78° C. After the pressure of the autoclave had been fully released, the washing and drying vessels were purged with a weak nitrogen current and the nitrogen was also passed through the cooled trap. In the trap 106 grams of condensate were collected.

According to gas chromatographic analysis the condensate contained 88 mole percent of pentafluoroethyl iodide, corresponding to a yield of about 75%, calculated on the $CF_2I$—$CF_2I$ used.

I claim:
1. A process for the manufacture of pentafluoroethyl iodide which comprises reacting 1,1,2,2-tetrafluoro-diiodoethane or a mixture of tetrafluoroethylene and iodine in a molar ratio of 1:1 to 1:2 of the fluoroethylene to iodine with hydrogen fluoride in the presence of chlorine in a ratio of the fluoro compound to chlorine of 1:0.5 to 1:0.7 at a temperature in the range of from 50 to 170° C.
2. The process of claim 1, wherein the reaction is carried out at a temperature in the range of from 80 to 150° C.
3. The process of claim 1, wherein the molar ratio of 1,1,2,2-tetrafluoro-diiodoethane to chlorine is in the range of from 1:0.5 to 1:0.7.
4. The process of claim 1, wherein 1,1,2,2-tetrafluoro-diiodoethane and an excess of 0.5 to 1 mol of iodine are reacted with hydrogen fluoride.

References Cited
UNITED STATES PATENTS
2,714,618   8/1955   Woolf _____ 260—653.6
3,644,544   2/1972   Cammarata et al. ___ 260—653.7

DANIEL D. HORWITZ, Primary Examiner